United States Patent Office 3,130,583
Patented Apr. 28, 1964

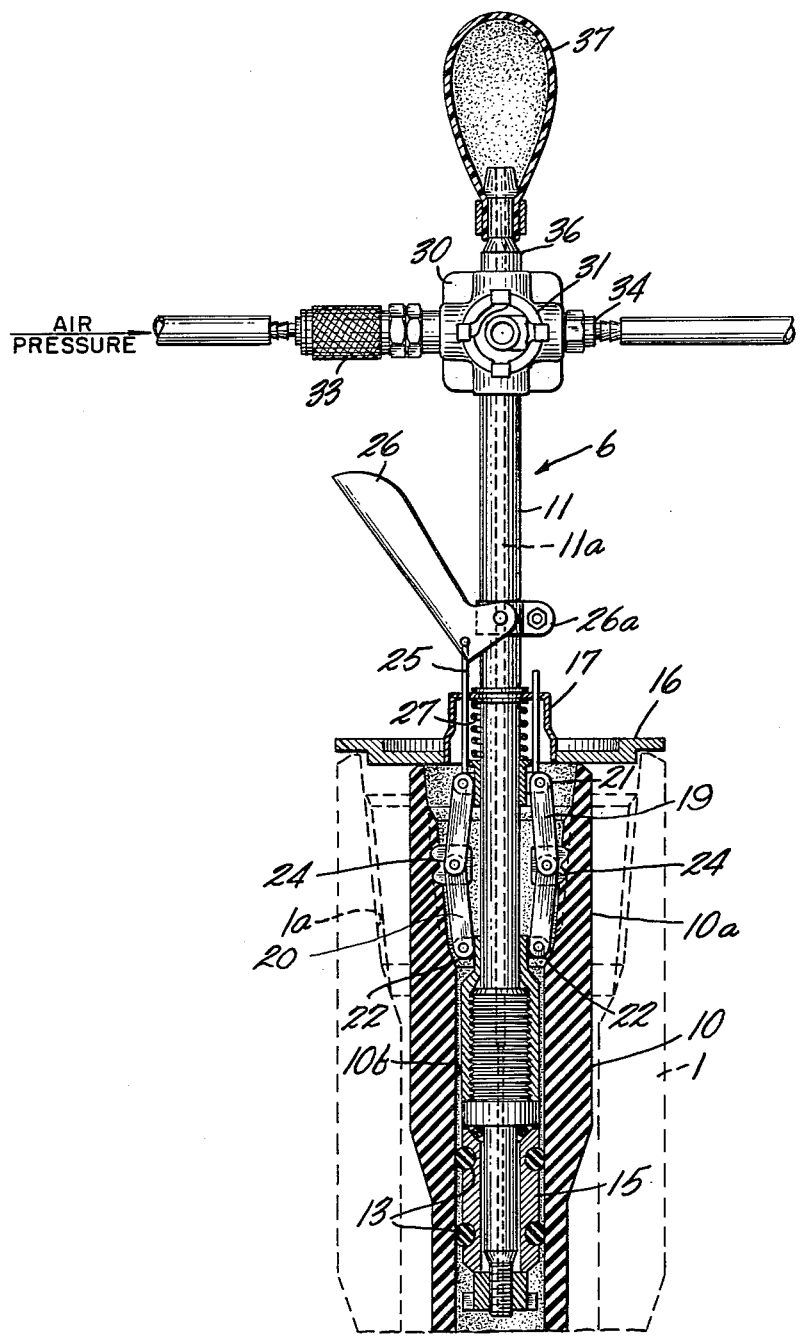

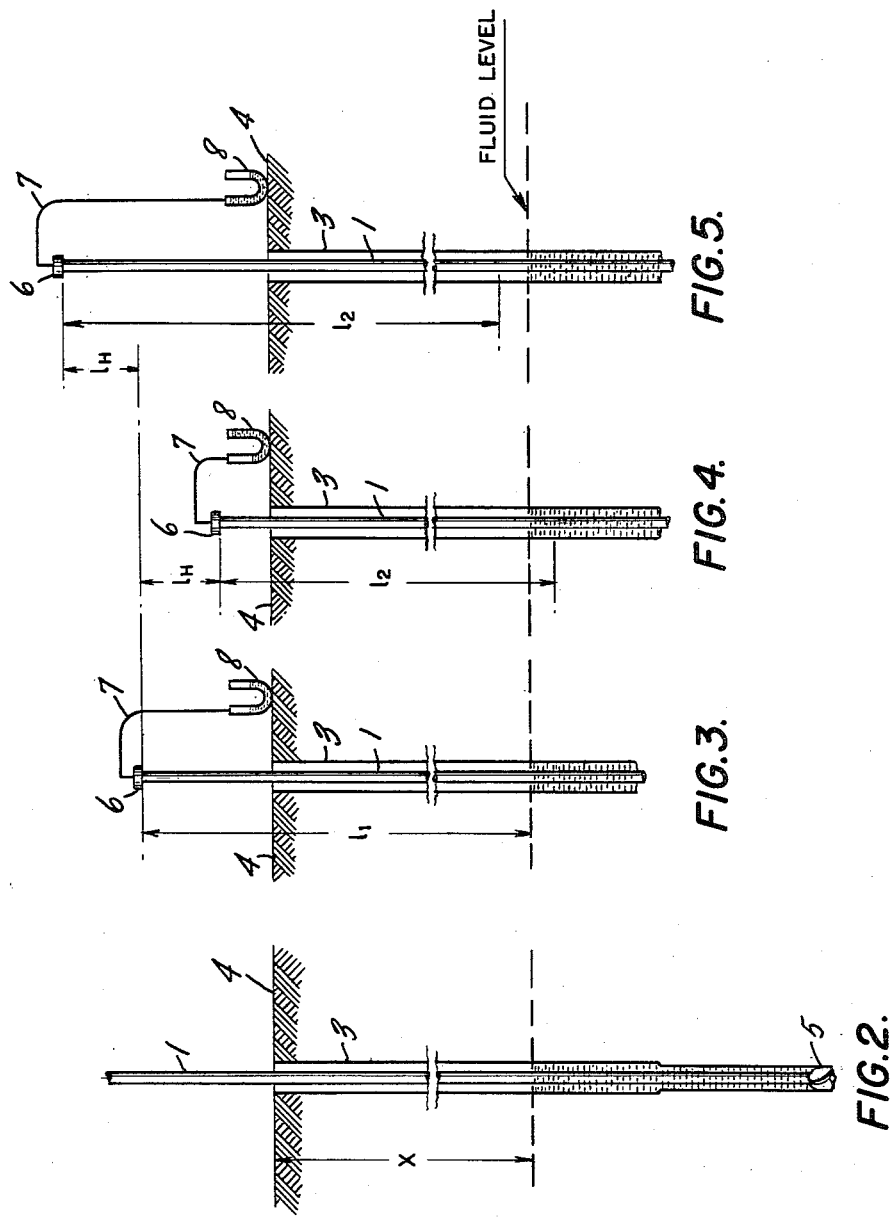

3,130,583
METHOD AND APPARATUS FOR ASCERTAINING THE LEVEL OF A LIQUID IN CASINGS AND DRILLED HOLES
Wilhelm Greve, Klein Oedesse uber Peine, and Erich Meinecke, Berkhopen uber Peine, Germany, assignors to Eastman International Company G.m.b.H., Westerfield, near Hannover, Germany, a company of Germany
Filed Aug. 22, 1962, Ser. No. 218,658
Claims priority, application Germany Aug. 24, 1961
16 Claims. (Cl. 73—299)

This invention relates generally to drilling apparatus and more particularly to a method and apparatus for ascertaining the level of a liquid in a casing or drilled hole.

The invention provides a method for ascertaining with respect to a known datum, for example the surface of the earth, the level of a liquid in a casing or hole in which is disposed a conduit or drill pipe internally of the casing. The drill pipe has one end either immersed or immersible in a liquid and has an opposite upper end unimmersed in the liquid. The method provides for closing the unimmersed end of the conduit or drill pipe to maintain gaseous pressure therein. Subsequent to the closing of the upper end the conduit is moved axially between at least two positions to vary the distance of the unimmersed end relative to the level of the liquid to vary gaseous pressure internally of said conduit relative to a known initial internal pressure.

Before the pipe is moved axially to vary the distance the initial pressure in the conduit is sensed and read out. When the pipe is moved to a second or terminal position the pressure changes are sensed and read out after the distance between the unimmersed end and the liquid level has been varied from a given or initial position and initial pressure condition in the pipe. Subsequent to the sensing and reading out of the pressure variations determining from the pressure readings and distances the pipe has been moved axially between readings the level of the liquid with respect to said datum.

The invention also provides a device for ascertaining the level of liquid in a casing usable in conjunction with a drill string extending axially internally of the casing and comprising a drill pipe having an upper open end unimmersed in the liquid in the casing. The device comprises a tubular cylindrical member insertable axially into the upper open end of the drill pipe. Means are provided to hold the tubular member axially in position in the drill pipe adjacent the upper end thereof. The tubular member has at least a portion thereof comprising expansible and contractible side walls expansible radially outwardly selectively to engage a portion of the inner walls of the drill pipe to effect a fluid-tight seal with the pipe. Means are provided in the device internally of the tubular member to expand radially outwardly the side walls thereof to effect the aforementioned fluid-tight seal.

The device is provided with means for permitting the sensing, and reading out, the pressure variations in the pipe as the distance of the upper end is varied with respect to the liquid surface the level of which is being ascertained. The device comprises means extending axially of the tubular member providing a fluid passageway axially of the tubular member in communication with the interior of the drill pipe. The fluid passageway defining means are sealed in a fluid-tight manner with respect to the tubular member so that when the device is mounted with the walls radially expanding outwardly communication can be established with the interior of the pipe only through the fluid passageway extending axially thereof. The device is provided with connections to the passageway for sensing the pressure variations and reading out the pressure variations which are then used in ascertaining or determining the liquid level in conjunction with other known data, the density variations.

The method and apparatus of the invention provides for determining the level of the liquid with respect to the known datum, for example the surface of the earth, by determining an initial pressure within the pipe which, when the pipe is open, corresponds substantially to atmospheric pressure. With the pipe or drill string in an immersed condition axial movement of the pipe with respect to a given set initial condition causes gaseous pressure variation within the pipe in response to the axial movement thereof with the lower end of the pipe immersed. These gaseous pressure variations are sensed and indicated or read out and are employed in ascertaining the level of the liquid with respect to the given datum.

Other features and advantages of the apparatus method in accordance with the present invention will be better understood as described in the following specification and appended claims, in conjunction with the following drawing, in which:

FIG. 1 is an elevation view, partly in section, of apparatus for carrying out the method according to the invention;

FIGS. 2–5 are diagrammatic vertical views of a drill pipe or drill string in a casing and are illustrative of the use of the apparatus in FIG. 1 and the method according to the invention.

The apparatus and method according to the invention provide for ascertaining with respect to a known datum the level of a liquid in a casing or in a drilled hole. The term drill pipe and drill string as employed in the specification are substantially equivalent in that the apparatus and method according to the invention can be used in conjunction with a single drill pipe or a plurality of drill pipes forming a drill string.

According to the invention a closure device 6 for quickly closing the open upper end of a drill pipe or drill string 1 is illustrated in FIG. 1. The drill pipe 1 as illustrated comprises a portion 1a which is of increased diameter because of threads thereon. The drill pipe 1 either alone or in combination with a plurality of drill pipes, not shown, forms a drill string extending axially of a casing 3 as illustrated in FIGS. 2–5 extending downwardly through a drilled hole and the earth 4. The drill pipe or drill string is provided with a drill 5 in the usual manner. The device 6 is mounted on the upper end of the drill and by means of a conduit 7 a gage or manometer 8 is connected thereto.

In order that the method of the invention will be better understood the quick closing closure device 6 will first be described. Those skilled in the art will understand that a device comparable to the device 6 may be used for carrying out the method of the invention as hereafter described.

The device 6 according to the invention comprises a tubular member 10 having an upper portion 10a and made of a flexible, expansible and contractible material. In order to carry out its intended function the device 6 is provided with a conduit 11 extending axially of the tubular member 10 downwardly therethrough through an inner axial bore 10b of the tubular member 10. A plurality of sealing members or rubber rings 13 extending circumferentially of a replaceable piston-like member 15 secured to the tubular rod or conduit 11 provide an effective seal between the piston-like member and more particularly between the conduit 11 and the inner walls of the member 10 so that a completely fluid-tight seal is effected when the device 6 is placed in position on the pipe as illustrated in FIG. 1. Communication with the inside of the pipe is established through the conduit 11 which defines a fluid passageway internally of the member 10.

The member 10 is held in position adjacent the upper end of the pipe by a flange member 16 having a tubular portion 17 disposed circumferentially of the pipe 11 and secured thereto. In order to provide for rendering the member 10 effective for completely closing the open end of the drill string or pipe 1 a system or toggle mechanisms comprising a plurality of angularly disposed toggle members, for example, toggle members 19 and 20 pivotally secured to each other with the upper toggle member 19 pivotally secured to a sleeve 21 with the member 20 pivotally secured to a sleeve 22. These toggle members carry bearing members 24 engaging the inner side walls of the hollow tubular member 10 for deflecting it radially outwardly upon actuation of an actuating sleeve 25 connected to a pivoted actuating lever 26 secured to the conduit 11 by a clamp 26a on which it pivots. When the lever 26 is in a raised condition it renders the device 6 ineffective.

When the upper end of the pipe is to be closed the device 6 is positioned as illustrated in FIG. 1 and the actuating lever 26 is actuated downwardly releasing a spring 27 internally of the sleeve 25 which biases the sleeve 21 downwardly and expands the upper portion 10a of the tubular member 10 so that the outer side walls thereof engage the inner periphery of the pipe in the threaded portion thereof and illustrated in broken lines to carry out an effective seal. Since an internal seal is also provided internally of the axial bore of the member 10 communication with the interior of the pipe can only be established with the fluid passageway 11a of the conduit 11. In order to provide for various internal diameters of pipes the sleeves 21 and 22 can be variably spaced axially on the conduit rod 11 under control of the spring 27 since the sleeve 21 is slidable. When the lever 26 is moved upwardly the member 10 is contracted radially inwardly to the position shown in FIG. 1.

The device 6 is provided with a gaging head 30 comprising a multi-way valve 31 providing for selective connection of a fluid passageway 11a in the conduit 11 to a connection 33 for selectively applying air pressure or inert gas from a source, not shown, to the pipe as hereinafter described. The valve also provides for a connection 34 to which a gage or sensing and indicating means, for example the manometer 8, as hereinafter described is connected. On top of the gage head is provided a nipple 36 to which is connected an inflatable and deflatable bag or balloon 37 made of rubber or plastic which can be expanded by internal air pressure variations internally of the pipe as hereinafter described. The valve can control supply of pressure from the pipe to this bag as later described.

In order to carry out the method invention the device 6 is positioned in a drill pipe or drill string 1 and then the effective seal or closing of the pipe is carried out. The method steps for various examples for carrying out ascertaining of the liquid level in a hole or drill casing 3 will be hereinafter described.

When the drill pipe has the closure device 6 connected thereto closing it and if the drill pipe is lowered or raised in the casing 3 the air within the drill pipe is, of course, somewhat compressed or pressure is reduced and it is these pressure readings which are taken according to the method of the invention. Any pressure variations can be read off in the air indicating means and sensing means 8 so that in conjunction with the dimensions of the drill pipe and the immersed depth $l_H$ or raising thereof $l_H$ the level of the liquid corresponding to the distance X of the liquid surface from the surface of the earth 4 can be ascertained.

In a first example the drill pipe to begin with is suspended, not shown, above the liquid level. The pressure within the pipe is equal to atmospheric pressure. The drill pipe is then closed with its top end with the closure device 6 of the type heretofore described and is dipped a few meters into the liquid within the casing 3. A certain gaseous or air pressure will build up within the pipe which will be proportional to the immersed depth in relation to the empty space above it. If one assumes that the liquid level is, for example, sixty meters below the surface and the drill pipe is immersed one meter then the pressure in the drill pipe will, according to the specific gravity of the flushing liquid in the drill casing be approximately equal to a water column (W.C.) of 140 mm. The pressure is easily measured with the precision gage or with a water filled U-tube or manometer 8 attached to the closure device in the manner, for example, as heretofore described.

The pressure variations can also be determined by means of a balloon method. In this case the plastic bag or balloon 37 is expanded by a pressure of approximately equal to a 140 mm. W.C. thus indicating the moment of immersion simply and reliably. Another way of sensing the point of immersion and/or withdrawal of the lower end of the pipe according to the invention is the determination of the reduction or rise of pressure within the drill pipe when the drill pipe is immersed or withdrawn out of the liquid, by the use of a precision gage able to carry out sensing of pressure drops and increases.

With the device 6 mounted thereon the pipe or drill string 1 is suspended in the liquid the pressure within the interior of the pipe will diminish as the pipe is lifted upwardly since the space above the liquid level within the pipe will increase and a column of liquid corresponding to the pressure drop will be lifted with it. If the drill pipe is withdrawn sufficiently so that it emerges from the liquid its contents which are also lifted will run out and the pressure pipe will return to the substantially initial condition corresponding, for example, to one atmosphere.

If the drill pipe is withdrawn slowly from the liquid the liquid running out of the pipe will raise the liquid level in the drill hole or casing so that the lower end of the pipe will again be immersed before the pipe is empty. Thus, the pressure within the pipe would not immediately rise to one atmosphere but only after further removal of the pipe completely clear of the liquid. This method enables the liquid level in the bored hole or casing to be determined very precisely since one knows the distance the pipe is moved and the point at which the pressure increases and pressure drops so that the distance X, the distance from the liquid level to the surface, can be readily calculated.

One may also, for example, before pulling up the drill pipe introduce air under pressure of a few tenths of an atmosphere into the drill pipe through the device connection 33. It will be understood by those skilled in the art that a suitable gas, for example, nitrogen can be used other than compressed air. With the pipe charged in this manner while the pipe is being lifted as before described the pressure will at first drop slowly and when the lower end of the pipe is clear of the liquid the pressure drops suddenly to one atmosphere. If the pressure provided internally of the pipe is sufficient part of the compressed air or gas will leave the drill pipe before the lower end of the pipe is completely clear of the liquid. This is observable as a sudden drop of pressure on the gage or indicating and sensing means 8 which facilitates an exact determination of the liquid level. The gas or air under pressure within the pipe furthermore insure the speedy and sure discharge of contents of the pipe even if some material is attached to the interior of the pipe.

A third example of the method comprises measurement of pressure differences arising during the lowering of an immersed drill pipe. In the usual case of drilling flushing water losses occur in a bored hole or casing and the water level will change. As illusrated in FIG. 2 where the drill pipe is shown in an immersed condition in order to prepare for the gaging operation according to the invention the kelly ("grief") stem, not shown, the flushing contents of the drill pipe will also sink the liquid level of the casing. The drill pipe is closed with the closure device 6 as heretofore described. With the pipe or drill string immersed it is lowered or drawn upwardly and the pressure within the drill pipe will build up a corresponding pressure or reduce a corresponding pressure which can be measured in the gage as heretofore described. Thus, if one starts from an initial condition as illustrated in FIG. 3 the sensing and indicating means 8 has the water columns on both legs of the U-tube equal. The upper unimmersed end is a distance $l_1$ from the surface of the liquid. If the upper end of the pipe is lowered by moving the pipe 1 axially in the casing 3 downwardly a distance $l_H$ the water level within the pipe drops relative to the liquid level in the casing and the distance between the upper end of the pipe 1 and the level of the liquid therein is $l_2$. The manometer 8 then has the indicating liquid column on the left leg drop and the right hand column rises because of the increased pressure in the pipe. The initial readings are taken as well as the change of distance and new manometer readings. The upper end of the pipe is then raised a comparable distance $l_H$ above the initial position thereof and the water column therein rises because of the corresponding pressure drop. The distance between the column in the pipe and the top of the pipe is the same $l_2$ and the readings on the manometer are exactly the reverse as when the pipe was lowered. Thus, the water level in the casing is bracketed and is ascertained from the $l_H$ readings and manometer readings.

In the event of a constant liquid level the measured values of the pressures before and after moving the drill pipe axially and determination of the different distances by which the drill pipe is lifted or lowered together with the specific gravity of the flushing liquid will be available to indicate by suitable calculations the precise level of the liquid in the drilled hole or casing. In the event of a randomly variable liquid level sufficient data determined by the above-described method can be made available if one carries out several measurements or readings by moving the upper end of the pipe relative to the surface of the level through several movements with different immersion depths of the drill pipe.

The determination of the liquid level relative to a given datum, for example, the surface of the earth and determination of the distance X therefrom is illustrated by exemplary data taken according to the invention as follows:

After attaching the quick closure device with the connecting valve open the drill pipe is first lifted to approximately 5 to 10 m. above the rotary table and the connection with the U-tube through the connecting tubing is only made when the partial vacuum occurring has been equalized. The drill pipe is now lifted several metres and the partial vacuum then occurring is read off the pressure gage and noted. After returning the drill pipe to the half level (when the U-pipe should again show a differential pressure of 0 mm.) the drill pipe is lower by the same number of metres and the over-pressure occurring is also read-off the pressure gage and noted. The two measured values as well as the difference in level by which the drill piping in the one case was lifted and in the other case was lowered and also the specific gravity of the flushing liquid and the air pressure are then for the calculation of the liquid level in the bore hole inserted in the following formulae:

$$\text{Withdrawl of the drill pipe: } l_1 = \frac{(l_H - l_y)(p_1 - p_y)}{p_y}$$

$$\text{Sinking of the drill pipe: } = \frac{(l_H - l_y)(p_1 + p_y)}{p_y}$$

In these equations we have:

$l_1$=length of drill piping to the liquid level at commencement of the measurement
$l_H$=distance by which the drill pipe was lowered or raised in connection with the measurement, in metres
$l_y$=pressure difference in metres measured in the U-tube
$p_1$=atmospheric pressure at commencement of the measurement in ata.
$p_y$=pressure difference in ata. measured in the U-tube on lifting or lowering the drill piping
  =specific gravity of the flushing liquid.

When making the calculation according to these two formulae there will, because the formulae have been simplified, occur small differences from the true value with certain measurements, which, however, for the most part will compensate each other so that the true value for the depth of the level will be fairly exactly in the centre between the two values found.

EXAMPLE OF A MEASUREMENT IN A BORE HOLE 8⅝″ WITH 4½″ F.H. DRILL PIPING

*Measured Values*

Air pressure_____ $p_1$=0.9737 ata.
                                      =1.18.
Sp. g. of the flushing liquid_____ 7.3 m. above
Level of drill pipe at the commencement    upper edge of
  of measurement_____    rotary table.
Indication of water-filled U-tube_____ ±0 mm.

After lifting the drill pipe 6.0 m. the partial vacuum in the U-tube was +575 mm. W.C.
After lowering the drill pipe to its original position the U-tube again shows ±0.0 mm. W.C.
After lowering the drill pipe by 6.0 m., the over-pressure in the U-tube was +655 mm. W.C.

$$\text{Lifting the drill pipe: } l_1 = \frac{6.0 - \frac{0.575}{1.18}0.9737 - 0.0575}{0.0575}$$

$$= 88.2 \text{ m.}$$

$$\text{Lowering the drill pipe: } l_1 = \frac{6.0 - \frac{0.655}{1.18}0.9737 + 0.0655}{0.0655}$$

$$= 86.4 \text{ m.}$$

The means value and thus the level in the bore hole is 87.35 m. The value X is now very easy to determine since one only needs to deduct the height of the drill pipe about ground level from the measurement $l_1$.

What we claim and desire to secure by Letters Patent is:

1. A method for ascertaining with respect to a known datum the level of a liquid in a casing in which is disposed a conduit internally of said casing has one end immersed in said liquid and an opposite end unimmersed in said liquid, closing the unimmersed end of the conduit to maintain gaseous pressure therein, moving the conduit axially between at least two positions to vary the distance of the unimmersed end relative to the levels of the liquid to vary gaseous pressure internally of said conduit relative to a known initial internal pressure, before varying said distance sensing the initial pressure in said conduit, sensing and reading out the pressure in said conduit after said distance between said unimmersed end and said liquid level have been varied, and determining from said pressure readings and the distances said conduit is moved between pressure readings the level of said liquid with respect to said datum.

2. A method according to claim 1, in which said conduit is immersed into said liquid and withdrawn and the pressure changes sensed and read when first immersed into said liquid and when withdrawn from said liquid.

3. A method for ascertaining with respect to a known datum the level of a liquid in a casing in which is disposed a conduit internally of said casing has one end immersed in said liquid and an opposite end unimmersed in said liquid, closing the unimmersed end of the conduit to maintain gaseous pressure therein, moving the conduit axially between a plurality of positions to vary the distance of the unimmersed end relative to the levels of the liquid to vary gaseous pressure internally of said conduit relative to a known initial internal pressure, before varying said distance sensing the initial pressure in said conduit, sensing and reading out the pressure in said conduit after each time said distance between said unimmersed end and said liquid level have been varied, and determining from said pressure readings the level of said liquid with respect to said datum.

4. A method for ascertaining with respect to a known datum the level of a liquid in a casing in which is disposed a conduit internally of said casing has one end immersed in said liquid and an opposite end unimmersed in said liquid, closing the unimmersed end of the conduit to maintain gaseous pressure therein, moving the conduit axially between a plurality of positions to vary the distance of the unimmersed end relative to the level of the liquid to vary gaseous pressure internally of said conduit relative to a known initial internal pressure, before varying said distance introducing under pressure a gaseous fluid into the conduit and sensing the initial pressure in said conduit, sensing and reading out the pressure in said conduit after said distance between said unimmersed end and said liquid level have been varied, and determining from said pressure readings and from the distances said conduit is varied the level of said liquid with respect to said datum.

5. A method according to claim 4, in which said conduit is immersed in said liquid and the pressure therein is sensed and read when immersed in said liquid, and in which said conduit is withdrawn from said liquid and the pressure is sensed and read at the point of withdrawal.

6. In a method for ascertaining with respect to a known datum the level of a liquid in a casing in which is disposed a conduit internally of said casing and having an upper end at least partially open, the steps comprising, closing the unimmersed end of the conduit to maintain gaseous pressure therein, moving the conduit axially between at least two positions to vary the distance of the unimmersed end relative to the level of the liquid to vary gaseous pressure internally of said pipe relative to a given internal pressure, before varying said distance sensing the initial pressure, internally of said conduit, and sensing and indicating the pressure in said conduit after said distance between said unimmersed end and said liquid level have been varied.

7. In a method for ascertaining with respect to a known datum the level of a liquid in a casing in which is disposed a conduit internally of said casing and having an upper end at least partially open, the steps comprising, closing the unimmersed end of the conduit to maintain gaseous pressure therein, moving the conduit axially between at least two positions to vary the distance of the unimmersed end relative to the level of the liquid to vary gaseous pressure internally of said pipe relative to a given internal pressure, before varying said distance placing the interior of said conduit under a slight vacuum and sensing the initial pressure internally of said conduit, and sensing and indicating the pressure in said conduit after said distance between said unimmersed end and said liquid level have been varied.

8. In a method for ascertaining with respect to a known datum the level of a liquid in a casing in which is disposed a conduit internally of said casing and having an upper end at least partially open, the steps comprising, closing the unimmersed end of the conduit to maintain gaseous pressure therein, moving the conduit axially between at least two positions to vary the distance of the unimmersed end relative to the level of the liquid to vary gaseous pressure internally of said pipe relative to a given internal pressure, before varying said distance introducing a gaseous fluid under pressure into said conduit sensing the initial pressure internally of said conduit, and sensing and indicating the pressure in said conduit after said distance between said unimmersed end and said liquid level have been varied.

9. Apparatus for ascertaining the level of a liquid in a casing, comprising in combination with a drill pipe in said casing having an upper open end unimmersed in the liquid in said casing, a device for closing the open end of said pipe comprising a tubular member inserted axially in said open end of the pipe having flexible side wall portions, means on said device operable selectively for deflecting side walls of said tubular member radially outwardly against the inner periphery of said drill pipe to effect a fluid-tight seal between the side walls of said member and the inner surface of said drill pipe, means holding said tubular member positioned axially in said drill pipe, means extending externally of said drill pipe when said device is mounted on said unimmersed end of said drill pipe defining a fluid passageway internally of said tubular member extending longitudinally thereof and out of said drill pipe and in communication with the interior of said drill pipe, means providing a fluid-tight seal between said means providing said passageway and said tubular member to provide for fluid flow out of said pipe upper end only through said passageway, a plurality of means in communication with said passageway for sensing and indicating pressure changes internally of said drill pipe in response to axial movement of said drill pipe relative to said level of said liquid with the pipe immersed in said liquid, and means in said device for connecting the last-mentioned means selectively individually with said passageway.

10. Apparatus for ascertaining the level of a liquid in a casing, comprising in combination with a drill pipe in said casing having an upper open end unimmersed in the liquid in said casing, a device for closing the open end of said pipe comprising a tubular member inserted axially in said open end of the pipe having flexible side wall portions, means on said device operable selectively for deflecting side walls of said tubular member radially outwardly against the inner periphery of said drill pipe to effect a fluid-tight seal between the side walls of said member and the inner surface of said drill pipe, means holding said tubular member positioned axially in said drill pipe, means extending externally of said drill pipe when said device is mounted on said unimmersed end defining a fluid passageway internally of said tubular member extending longitudinally thereof and out of said drill pipe and in communication with the interior of said drill pipe, means providing a fluid-tight seal between said means providing said passageway and said tubular member to provide for fluid flow out of said pipe upper end only through said passageway, and means in communication with said passageway for sensing and indicating pressure changes internally of said drill pipe in response to axial movement of said drill pipe relative to said level of said liquid with the pipe immersed in said liquid.

11. Apparatus for ascertaining the level of a liquid in a casing, comprising in combination with a drill pipe in said casing having an open upper end unimmersed in the liquid in said casing, a device for closing the open end of said pipe comprising a tubular member inserted axially in said open end of the pipe having flexible side wall portions, means operable selectively for deflecting side walls of said tubular member radially outwardly against the inner periphery of said drill pipe to effect a fluid-tight seal between the side walls of said member and the inner surface of said drill pipe, means holding said tubular member positioned axially in said drill pipe, means extending externally of said drill pipe defining a fluid passageway internally of said tubular member extending longitudinally thereof and out of said drill pipe and in communication with the interior of said drill pipe, means providing a fluid-tight seal between said means providing said passageway and said tubular member to permit fluid flow out of said pipe upper end only through said passageway, means in communication with said passageway for sensing and indicating pressure changes internally of said drill pipe in response to axial movement of said drill pipe relative to said level of said liquid with the pipe immersed in said liquid, and connections on said device for introducing under pressure air or an inert gas into the interior of said pipe when said device is mounted thereon.

12. A device for ascertaining the level of a liquid in a casing usable in conjunction with a drill string extending axially internally of said casing and comprising a drill pipe having an upper open end unimmersed in said liquid, the device comprising, a tubular member insertable axially into the upper end of said drill pipe, means to hold the tubular member axially in position in said drill pipe adjacent the upper end thereof, said tubular member having a portion comprising expansible and contractible side walls expansible radially outwardly selectively to engage a portion of the inner walls of the drill pipe to effect a fluid-tight seal with said pipe, means internally of said tubular member to expand radially outwardly said side walls thereof and to effect said seal, means extending axially of said tubular member providing a fluid passageway axially of said tubular member to provide communication with the interior of said drill pipe when said tubular member is in position effecting said seal, said means providing said passageway comprising a connection thereon for sensing pressure variations internally of said pipe, and means effecting a fluid-tight seal between said tubular member and said means providing said passageway to cause gaseous fluid to flow through said passageway only when said device is mounted on said pipe.

13. A device for ascertaining the level of a liquid in a casing usable in conjunction with a drill string extending axially internally of said casing and comprising a drill pipe having an upper open end unimmersed in said liquid, the device comprising, a tubular member insertable axially into the upper end of said drill pipe, means to hold the tubular member axially in position in said drill pipe adjacent the upper end thereof, said tubular member having a portion comprising expansible and contractible side walls expansible radially outwardly selectively to engage a portion of the inner walls of the drill pipe to effect a fluid-tight seal with said pipe, means internally of said tubular member to expand radially outwardly said side walls thereof and to effect said seal, means extending axially of said tubular member providing a fluid passageway axially of said tubular member to provide communication with the interior of said drill pipe when said tubular member is in position effecting said seal, said means providing said passageway comprising a connection thereon for connecting thereto means for sensing pressure variations internally of said pipe, means for sensing pressure variations internally of said pipe connected to the last-mentioned connection, and means effecting a fluid-tight seal between said tubular member and said means providing said passageway to cause gaseous fluid to flow through said passageway only when said device is mounted on said pipe.

14. A device according to claim 13, in which said means for sensing said pressure variations comprises an inflatable and deflatable bag.

15. A device according to claim 13, in which said means for sensing said pressure variations comprises a calibrated pressure-responsive gage.

16. A device according to claim 15, in which said gage is a calibrated manometer.

No references cited.